United States Patent Office 3,176,445
Patented Apr. 6, 1965

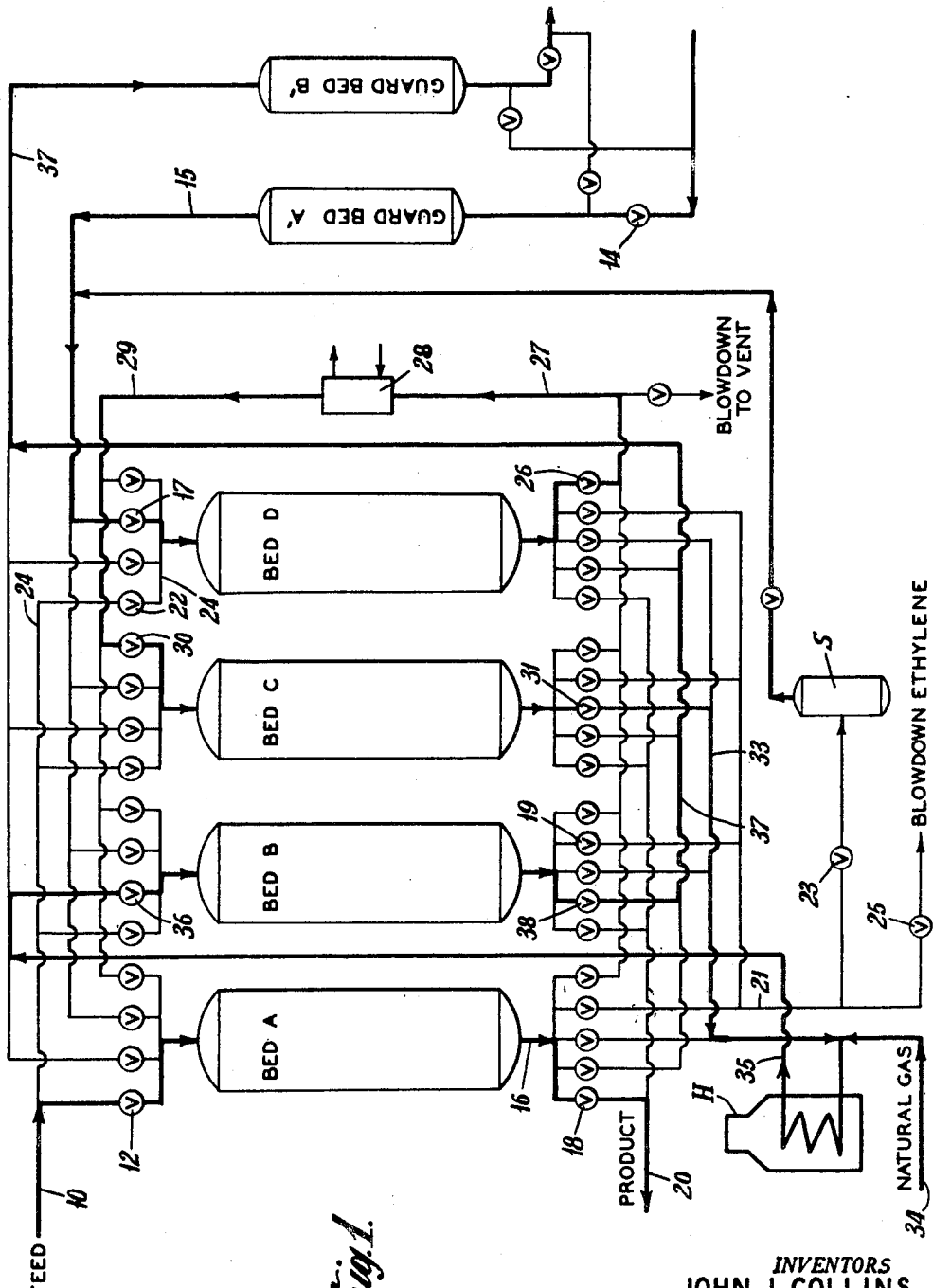

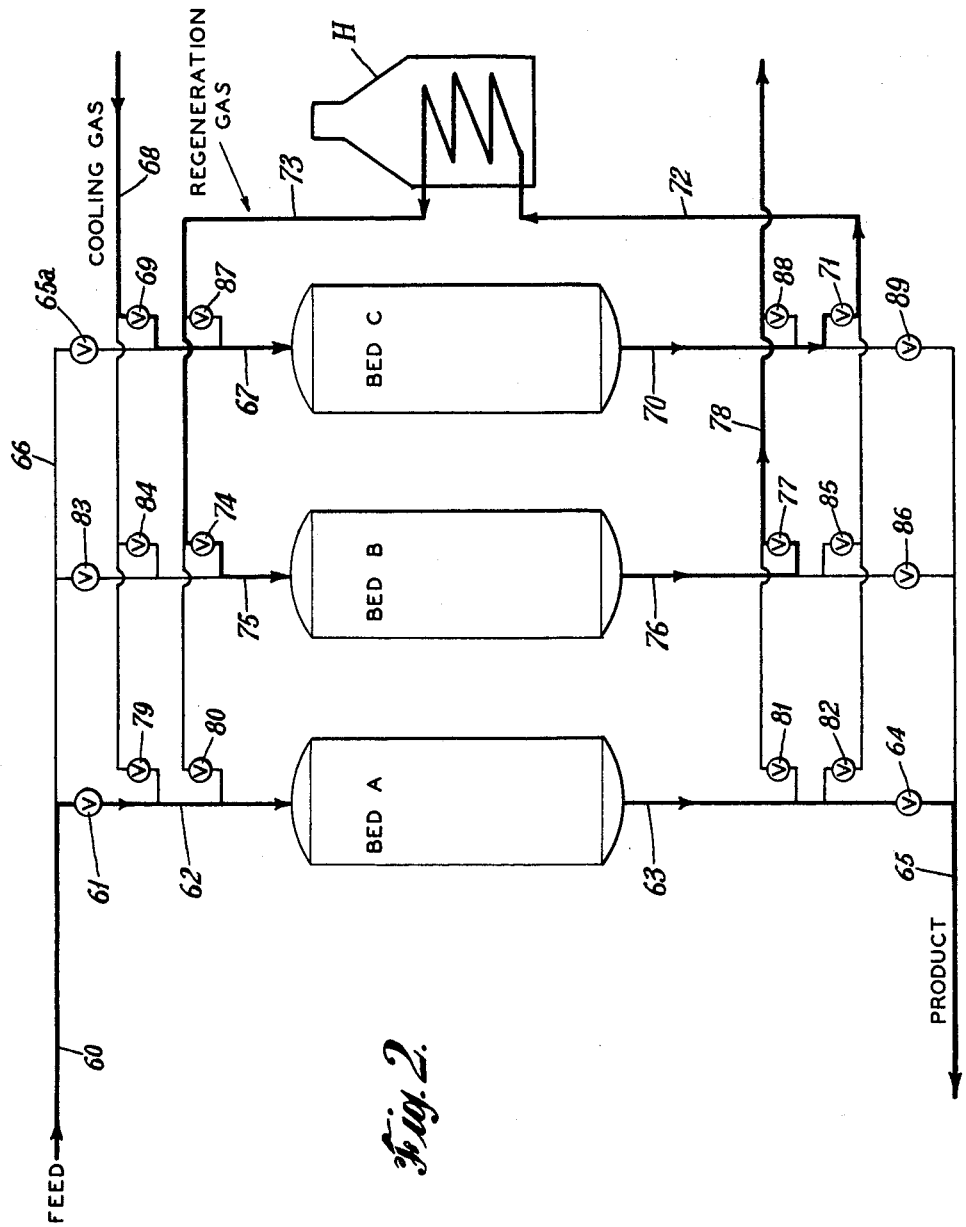

3,176,445
METHOD OF SEPARATING GAS MIXTURES BY ADSORPTION
John J. Collins, Tonawanda, N.Y., and Edward L. Clark, Houston, Tex., assignors to Union Carbide Corporation, a corporation of New York
Filed Sept. 16, 1960, Ser. No. 56,514
14 Claims. (Cl. 55—58)

This invention relates to an improved process for recovering substantially pure product gas from a gas mixture containing such product gas and impurity gases, and more specifically to a process for removing carbon dioxide impurity from a gas mixture containing ethylene and carbon dioxide by contacting such mixture with a crystalline zeolitic molecular sieve material.

Ethylene is a basic chemical for many organic synthesis processes. Several types of ethylene-formation processes are in use today. By far the most common is that which employs some sort of externally fired tubular coil by means of which the feedstock is thermally cracked so as to provide ethylene in a mixture of hydrogen, hydrocarbons and other impurities such as sulfur, carbon dioxide and water. Basically an ethylene producing unit is made up of three parts; the ethylene formation section; the section wherein auxiliary purification of the ethylene takes place and the separation unit wherein the ethylene is separated from other hydrocarbons such as the methane and lighter hydrocarbons. The separation of ethylene from methane usually is carried out in a refrigerated column called a demethanizer unit from which the methane and lighter hydrocarbon is passed as an overhead or demethanizer off-gas. This off-gas consists primarily of hydrogen and methane with a small amount of ethylene. The ethylene content of demethanizer off-gas ranges from about 0.2 to about 12 mol percent with the typical content being between 0.5 to 3.0 mol percent. The end-use of the ethylene, whether such be for the manufacture of organic chemicals such as ethyl-alcohol or polymer products such as polyethylene, is independent of the source or method of manufacture of the ethylene as long as the purity of the ethylene is satisfactory for the particular end-use.

This invention in its broader aspects provides a method of increasing the product recovery in a separation cycle utilized for the purification of a product gas stream where there is available a gas stream containing minor amounts of the product gas desired.

The problem generally in gas-separation cycles is not only one of selectively removing impurities from product gas but also one of improving the percentage of yield of the product gas from the system. The present invention is most admirably suited to an olefin formation process wherein product-lower weight olefins are separated from other impurities and there is available, in such process, a gas-stream containing minor amounts of product gas, as for example the ethylene formation process where there is readily available a demethanizer overhead gas which contains from about 0.2 to about 12 mol percent with the usual content being 0.5 to 3.0 mol percent ethylene which heretofore was often being burned as fuel and wasted. As a result of the novel method of recovering ethylene which was usually discarded the invention provides unusually high recovery of ethylene product when separating impurities such as carbon dioxide from ethylene.

Accordingly a principal object of this invention is to provide a novel separation process for removing impurity from a product gas formed in a process where there is available a by-product gas stream containing a minor amount of product gas.

Still another object is to provide a method for purifying lower weight olefins formed from a process wherein there is also produced a by-product gas stream containing minor amounts of such olefins.

Another object is to provide a method for separating carbon dioxide from ethylene wherein increased yields of ethylene are realized.

Briefly the above objects are realized according to the preferred form of the present invention by utilizing at least three crystalline zeolitic molecular sieve filled chambers alternating consecutively in the steps of (a) adsorption, (b) blowdown and repressurization, (c) thermal desorption with cocurrent flow of purge gas and (d) cooling and partial preloading with product gas, (e) blowdown and (f) repressurization with ethylene feed.

The step of cooling and pre-loading may be performed simultaneously when using a three bed system. In four bed system the cooling and pre-loading steps are done step wise. Selection of a four bed system over a three bed system depends on (1) purity of demethanizer overhead (2) ethylene concentration-demethanizer overhead (3) quantity of demethanizer overhead available.

In order that one skilled in the gas-separation art may more fully understand the inventive concept disclosed herein the following descriptions and discussion will be directed to the separation of carbon dioxide from ethylene but it is to be understood that the basic concept may also be utilized in a propylene formation unit where there is readily available a by-product gas stream containing minor amounts of propylene.

The inventive process described hereinafter is particularly adaptable to a process for separating $CO_2$ from ethylene wherein the $CO_2$ content of the impure ethylene feed stream ranges from about 50 parts per million to about 3 mol percent with a typical content of 0.2 to 1 mol percent.

Some advantages of the inventive process are:

(1) The use of demethanizer off-gas to cool the molecular sieve bed after desorption effects a recovery of ethylene from the off-gas which is normally burned as fuel. The recovered ethylene is ultimately added to the purified product. Additionally in a three bed system the adsorption of ethylene from the demethanizer off-gas during the cooling step effects a partial pre-loading of adsorbate on the zeolitic molecular sieve thereby reducing the heating effect when the ethylene-rich feed stream contacts the sieve bed on the adsorption step. In a four bed system the cooling and preloading steps are performed stepwise. The demethanizer off-gas used to cool the molecular sieve bed after desorption is previously used to pre-load another molecular sieve bed with the result that ethylene is removed before the demethanizer off-gas is used as a cooling gas. Adsorpt of the ethylene from the demethanizer off-gas during the pre-loading step effects at least a partial pre-loading of adsorbate on the zeolitic molecular sieve thereby reducing the heating effect when the ethylene rich feed stream contacts the molecular sieve bed on the adsorption step.

Pre-loading the molecular sieve bed with ethylene results in a significant improvement in the operation of the purification system. This is due to:

(I) Reduced bed-temperature rise during repressurization of the bed with ethylene feed just prior to adsorption. This will result in a higher carbon dioxide operating loading during the adsorption step of the purification.

(II) Reduced ethylene product contamination due to the presence of adsorbed impurities loaded on the bed during cooling. Since the bed is now loaded with ethylene at the start of adsorption, there is very little adsorption on the bed of ethane, methane, and other components of the ethylene-bearing cooling gas, which would normally have moderately high bed-loadings but are less strongly adsorbed than ethylene.

(III) Reduced carbon dioxide concentrations in the ethylene product during adsorption. Since the temperature rise at the start of adsorption is minimized, the residual carbondioxide left at the effluent end of the bed during regeneration will have a lower equilibrium partial pressure in the ethylene product. This results in a lower $CO_2$ concentration in the ethylene product for any given set of operating conditions.

(IV) Reduced deactivation rate and increased adsorbent life since the bed is now exposed to feed ethylene at a lower average temperature. This tends to suppress any ethylene polymerization and/or cracking.

(2) The hot purge desorption is done co-current to the direction in which the molecular sieve bed was used in the adsorption stroke. This is important so that the first desorbate will be rich in carbon dioxide. This desorbed carbon dioxide then flows through the bed effecting a displacement desorption of ethylene remaining in the down-stream part of the bed. Thus the ethylene is effectively desorbed at a lower temperature and the accumulation of carbonaceous deposits through the polymerization and/or cracking is materially reduced. This reduces the rate at which the adsorptive capacity of the molecular sieve would be reduced.

It is to be understood that the expression "pore size," as used herein refers to the apparent pore size, as distinguished from the effective pore diameter. The apparent pore size may be defined as the maximum critical dimension of the molecular species which is adsorbed by the zeolitic molecular sieve in question, under normal conditions. Maximum critical dimensions may be defined as the diameter of the smallest cylinder which will accommodate a model of the molecule constructed using the best available values of bond distances, bond angles, and Van der Wall radii. Effective pore diameter is defined as the free diameter of appropriate silicate ring in the zeolite structure. The apparent pore size for a given zeolitic molecular sieve will normally be larger than the effective pore diameter.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolite molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. This space is available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

Among the naturally occurring zeolitic molecular sieves suitable for use in the present invention are chabazite and erionite, mordenite, and faujasite. The natural materials are adequately described in the chemical art. The suitable synthetic zeolitic molecular sieves include zeolites A, D, R, S, T, X, Y, and L.

The preferred zeolitic molecular sieves are those that have pore sizes of at least 4.6 Angstrom units and include erionite, calcium-rich chabazite, faujasite, the synthetic zeolites, S, Y, L, T, and the divalent cation exchanged zeolites A, D, and R. The larger pore size permits more rapid adsorption and desorption of the carbon dioxide molecules leading to faster operating cycles in the process of this invention.

The pore size of the zeolitic molecular sieves may be varied by employing different metal cations. For example, sodium zeolite A has a pore size of about 4 Angstrom units whereas calcium zeolite A has a pore size of about 5 Angstrom units, when calcium cations have been exchanged for at least about 40 percent of the sodium cations, so that the latter would be suitable as a preferred material for use in the present invention.

Zeolite A is a crystalline zeolitic molecular sieve which may be represented by the formula:

$$1.0\pm0.2\frac{M}{n}_2O:Al_2O_3:1.85\pm0.5SiO_2:yH_2O$$

wherein M represents a metal, n is the valence of M, and y may have any value up to about 6. The as-synthesized zeolite A contains primarily sodium ions and is designated sodium zeolite A. Zeolite A is described in more detail in U.S. Patent No. 2,882,243, issued April 14, 1959.

Zeolite T is a synthetic crystalline zeolitic molecular sieve whose composition may be expressed in terms of oxide mole ratios as follows:

$$1.1\pm0.4[xNa_2):(1-x)K_2O]:Al_2O_3:6.9\pm0.5SiO_2:yH_2O$$

wherein x is any value from about 0.1 to about 0.8 and y is any value from about zero to about 8. Further characterization of zeolite T is by means of X-ray diffraction techniques as described in U.S. Patent No. 2,950,952, issued August 30, 1960.

Zeolite X is a synthetic crystalline zeolitic molecular sieve which may be represented by the formula:

$$0.9\pm0.2M_2O:Al_2O_3:2.5\pm0.5SiO_2:yH_2O$$

wherein M represents a metal, particularly alkali and alkaline earth metals, n is the valence of M, and y may have any value up to about 8, depending on the identity of M and the degree of hydration of the crystalline zeolite. Sodium zeolite X has an apparent pore size of about 10 angstrom units. Zeolite X, its X-ray diffraction pattern, its properties, and methods for its preparation are described in detail in U.S. Patent No. 2,882,244 issued April 14, 1959.

Zeolite Y is described and claimed in U.S. patent application, Serial No. 728,057 filed April 14, 1958, and U.S. patent application Serial No. 862,062, filed concurrently herewith, both in the name of D. W. Breck, as well as Serial No. 109,487 filed May 12, 1961 and issued April 21, 1964 as U.S. Patent No. 3,130,007. The first mentioned applications are now abandoned.

Zeolite L is described and claimed in U.S. patent application Serial No. 711,565, filed January 28, 1958, in the names of D. W. Breck and N. A. Acara. This application was abandoned in favor of continuation-in-part application Serial No. 214,479 filed August 3, 1962.

Zeolite D is described and claimed in U.S. patent application Serial No. 680,383, filed August 26, 1957, in the name of R. M. Milton. This application was abandoned in favor of continuation-in-part application Serial No. 273,549.

The adsorbent is employed in the form of pellets, which are more conveniently utilized in packed chambers than the unpelletized finely crystalline zeolitic molecular sieves. The commercially available pellets contain about 20% clay binder.

In the preferred embodiment of the invention there is provided a four bed adsorption system as shown in FIG. 1. Each bed contains molecular sieve material having a pore size of at least 4.6 angstrom units. This pore size is preferred because an adsorption front will be established more easily if the molecules of the carbon dioxide impurity have an easy ingress and egress from the inner adsorption area of the sieve.

The preferred embodiment is most admirably suited to a separation of carbon dioxide from ethylene in an ethylene formation process where the demethanizer off-gas is contaminated with carbon dioxide and acetylene and where the demethanizer off-gas lacks sufficient ethylene for efficient pre-loading of the sieve bed.

In this separation cycle carbon dioxide containing ethylene stream is contacted with the first adsorption zone containing zeolitic molecular sieve material as an adsorption step thereby adsorbing at least most of the carbon dioxide and some of the ethylene product gas.

The adsorption pressure for the process ranges from atmospheric to 1500 p.s.i.a. with typical feed pressures between 50 and 600 p.s.i.a. The feed temperature can range from about 40° F. to 250° F. with typical values between 50° F. and 100° F. If temperatures below 40° F. are used liquid phases may be encountered and desorption is made more difficult. While if temperatures much above 250° F. are employed the working loading is impractically low and the deactivation rate may become excessive. Sub-atmospheric pressure engenders the problems of vacuum techniques with possibility of air leaks into the system. Also mass flow rates involve excessive velocities in the equipment. Above 1500 p.s.i.a., special equipment is required and feed holdup in the bed voids become unreasonably high.

As the carbon dioxide laden feed gas stream contacts the zeolitic molecular sieve bed the more strongly attracted polar carbon dioxide molecule is adsorbed in favor of the ethylene molecule and a carbon dioxide impurity adsorption front is established whereby the carbon dioxide molecule continuously displaces most of the adsorbed ethylene molecule. An impurity depleted product gas stream is discharged from the first adsorption zone.

At carbon dioxide breakthrough, that is when the gas stream leaving the first adsorption zone has not more than the maximum allowable carbon dioxide content the adsorption step is preferably stopped. At this point most of the ethylene adsorbed and not displaced by the carbon dioxide adsorption front is located toward the effluent end of the bed. Continuing purification to carbon dioxide breakthrough in the ethylene product rather than operating on a fixed cycle time results in less total ethylene holdup in the adsorption zone at the end of the adsorption step. By running to carbon dioxide breakthrough, the maximum amount of impurity is loaded onto the bed at the end of such adsorption step. By running on a fixed cycle time, the bed is over-designed until the adsorbent has been cycled for such length of time that the adsorbent has deactivated to the point where carbon dioxide breakthrough is occurring at the end of the adsorption stroke. The excess capacity is taken up by ethylene, about one-half of which is subsequently lost during regeneration. The other one-half is recovered during blowdown.

A controlled cocurrent depressurization step follows the adsorption step. It has been discovered that when the volume percent of carbon dioxide is greater than about 0.2 percent the use of a cocurrent depressurization step after the adsorption stroke becomes increasingly important in improving the yield of ethylene. A larger percentage of the total ethylene coadsorbed with the $CO_2$ on the adsorbent and entrapped in the void space in the crystalline zeolitic molecular sieve beds is recovered. By using the technique of cocurrent depressurization as described in detail in copending application Serial No. 60,709, now abandoned, and its continuation-in-part application Serial No. 221,033 filed September 4, 1962, essentially all of the entrapped ethylene may be recovered as product. The broad idea of cocurrent depressurization is claimed in these applications and is not our invention. The present process for recovering pure product gas from a gas mixture containing such product gas and impurity gases comprises a specific sequence of steps, and in a preferred embodiment one of these steps is cocurrent depressurization.

From the standpoint of both maximum recovery and purity, a cocurrent blowdown in the depressurization step is preferred. A cocurrent blowdown results in a higher ethylene recovery than a countercurrent blowdown for two reasons. First, the effluent end of the bed, which has the highest ethylene loading, ends up at the lowest final pressure when the blowdown is cocurrent. The net result will be desorption of the maximum amount of ethylene for a given final blowdown pressure. Secondly, by blowing down cocurrently, most, if not all of the carbon dioxide desorbed from the feed end of the bed will be readsorbed at the effluent end of the bed thus promoting ethylene desorption by displacement.

When the blowdown is cocurrent, the carbon dioxide content of the ethylene effluent will generally vary from $\sim<5$ p.p.m. at the start to $\sim<150$ p.p.m. at $\sim 16$ p.s.i.a. final pressure. When the blowdown is countercurrent, the carbon dioxide content of the ethylene effluent will generally vary from about its concentration in the feed to $<70$ volume percent.

As the $CO_2$ content of the ethylene feed decreases below 0.2 percent, and/or the pressure of the feed ethylene decreases, the advantages of a cocurrent blowdown (described above) are not as marked. In such cases, a countercurrent blowdown may be selected. From the standpoint of maximizing the $C_2H_4$ recovery during the blowdown, it may be advantageous to continue the blowdown to a pressure below ambient; in this case a vacuum pump or compression is needed. In no case will it be advantageous to reduce the pressure during the blowdown below the $CO_2$ partial pressure in the feed. The ethylene collected during the first stage of a controlled cocurrent depressurization is stored in a surge tank. This stored ethylene is later used to partially preload the adsorber bed on the pre-loading step in the process cycle. This ethylene is used to add more of such gas to the demethanizer off-gas which is the primary gas used to pre-load the adsorber bed.

The next step in the cycle is the regeneration step which is carried on in bed B after the blowdown. Cocurrent desorption is used for this step, that is, hot purge gas is caused to flow through the bed in the same direction as the gas feed stream. The hot purge gas consists, in this embodiment, of demethanizer overhead which has been used earlier for cooling, plus a natural gas stream. The regeneration step may employ any inert purge gas such as methane, nitrogen, hydrogen, etc. It is not necessary to use the effluent demethanizer gas from the bed on cooling although this may reduce the size of the heater necessary to heat the gas for purging purposes to a temperature desirable. Further if sufficient demethanizer off-gas is available to conduct the hot gas regeneration in the time period allocated to this step, inert gas need not be added to the stream entering the heater.

The next steps of cooling and pre-loading are conducted by use of the demethanizer overhead. The demethanizer gas is first purified in a guard bed to remove acetylene and carbon dioxide and then used to preload the cool adsorber bed D. Ethylene from the earlier mentioned surge tank is used to make up any additional ethylene required for pre-loading the bed. The effluent from this pre-loading step is used to cool adsorber bed "C." This method of operation prevents the loss of ethylene from the pre-loading step inasmuch as pre-loading is conducted past ethylene breakthrough. A pair of guard beds alternating in adsorption and desorption are used in the demethanizer overhead stream to remove carbon dioxide, acetylene and other impurities which are more adsorbable than ethylene, to guard against build up of such impurities in the main adsorber beds. Of course, if there are not impurities in the demethanizer overhead the guard beds are not necessary. After preloading, the bed is blown down at a controlled rate. This is done to remove the demethanizer overhead entrapped in the bed voids and to remove components of demethanizer overhead (e.g., methane, ethane) that are coadsorbed with the ethylene on the molecular sieve bed. The bed is then repressurized with feed and placed back on adsorption.

The following detailed description of an example of the preferred inventive separation cycle is presented so that those skilled in the art may more clearly understand the manner of practicing the invention.

Referring to FIG. 1, in this embodiment a carbon dioxide impurity containing ethylene stream is introduced at 22,000 lb./hr. and at about 75° F. and 510 p.s.i.g. through conduit 10 and valve 12 to zeolitic molecular sieve bed A. A carbon dioxide depleted ethylene gas stream is discharged from bed A through branch conduit 16, valve 18 and conduit 20. At the end of the adsorption stroke valves 12 and 18 are closed and bed A is switched to bed B position. Controlled blowdown is commenced by opening valve 19 and decreasing the pressure in bed B from about 510 to 250 p.s.i.g., as a result of the decrease in pressure, cocurrent depressurization technique ethylene is recovered from bed B and passes through conduit 21 and valve 23 to surge tank S. Then bed B is depressurized further in steps from about 250 to about 120 p.s.i.g. and then from 120 p.s.i.g. to atmospheric by closing valve 23 and opening valve 25. Previously closed valve 22 is opened permitting feed to be introduced through conduit 24 to bed D which was previously preloaded. While bed A is on adsorption, bed B is on blowdown and regeneration, bed C is on cooling and bed D is on pre-loading, blowdown, and repressurization. These latter steps are accomplished by providing demethanizer overhead at about 50° F. and about 125 p.s.i.g. through valve 14, guard bed A', conduit 15 and valve 17 to bed D which has previously completed a cooling stroke and is at about 100° F. The ethylene from the purified demethanizer stream is adsorbed by bed D thus pre-loading said bed prior to the introduction of the feed stream thereto. Eethylene depleted demethanizer gas leaves bed D through valve 26 and passes through conduit 27, heat exchanger 28, conduit 29, and valve 30 to bed C which was previously on regeneration and is at about 500 to 550° F. The cooling demethanizer gas leaves bed C through valve 31 and conduit 33 and passes into heater H. In this example there is insufficient demethanizer available to conduct the hot gas regeneration in the time period allocated. Thus natural gas is provided through conduit 34 to heater H. The combined demethanizer and natural gas stream is heated to about 550° F. and then is passed through conduit 35 and valve 36 to bed B where cocurrent regeneration takes place. The regeneration gas leaves bed B through valve 38 and then passes through conduit 37 up to guard bed B'. This effluent from adsorber bed B is used to desorb guard bed B'.

By periodically switching the flows to and from each of said adsorption zones each bed is caused to cyclically go through each step in the above described process.

In another embodiment of the invention there is provided a three bed adsorption system as shown in FIG. 2. Each zone contains a bed of molecular sieve material having an apparent pore size of at least about 4 angstrom units. A pore size of at least 4.6 angstrom units is preferred because the $CO_2$ impurity adsorption front will be established more easily if the molecules of such $CO_2$ impurity have an easy ingress and egress from the inner adsorption area of the sieve.

In this embodiment $CO_2$-laden feed gas stream is contacted with the first adsorption zone containing zeolitic molecular sieve material as an adsorption step thereby adsorbing at least most of the $CO_2$ and some of the ethylene product gas. As the $CO_2$-laden feed gas stream contacts the zeolitic molecular sieve bed the more strongly attracted polar $CO_2$ molecule is adsorbed in favor of the ethylene molecule and a $CO_2$ impurity adsorption front is established whereby the $CO_2$ molecule continually displaces part of the adsorbed ethylene molecule. An impurity depleted product gas stream is discharged from the first adsorption zone. At or before $CO_2$ breakthrough, the adsorption step is preferably stopped. In order to minimize coking of the sieve material on the desorption step, cocurrent desorption is employed. In this embodiment of the novel separation cycle the cocurrent desorption step and the cooling and preloading step are performed in series. These steps are accomplished by providing as a purge gas a demethanizer overhead gas to the third adsorption zone which has previously been reactivated or desorbed and which is at about 500° F. The demethanizer gas used for cooling is at a temperature substantially less than 500° F. preferably close to that of the feed gas at the adsorption stroke. As the cooling gas is passed through the bed and the bed cools, it will have an increasing adsorption capacity. As the ethylene-containing cooling gas passes through the bed being cooled most of the ethylene of the demethanizer gas will be adsorbed on the cool portion of the bed. An equilibrium condition exists between the ethylene in the cooling gas and the ethylene loaded on the bed. For example, if the pressure of the cooling gas (assume essentially all hydrogen) is 150 p.s.i.a. and the ethylene concentration is 1.5% the equilibrium ethylene loading on the cool bed ($\sim$100° F.) is $\sim$5.5 lb. $C_2H_4$/100 lb. molecular sieve type 5A. [If the pressure of the cooling gas is $\sim$150 p.s.i.a. (assume essentially all $CH_4$), and the ethylene concentration is 1.5%, the equilibrium ethylene loading is $\sim$4.2 lb./100 lb. molecular sieve.]

The cooling gas leaving the third adsorption zone may be (a) sent to fuel, (b) used somewhere else in the plant, (c) passed through a make-up heater and used to purge the molecular sieve bed that is regenerating.

In this case the gas leaving the third adsorption zone is passed through a heater and then caused to flow in a cocurrent direction through a second adsorption zone to desorb or regenerate said zone. In the regeneration or desorption step, the molecular sieve material at the inlet end of the bed is contacted with the now hot purge gas. As the temperature increases the more strongly held carbon dioxide will be desorbed and a carbon dioxide desorption front will be established at one end of the bed. The carbon dioxide from this desorption front will be readsorbed by the cooler molecular sieve in a moving carbon dioxide adsorption front further down the bed and the carbon dioxide "pulse" which is created because of the continual desorption and adsorption of the carbon dioxide molecules is caused to move longitudinally through the bed by the hot purge gas. As such carbon dioxide adsorption front of the carbon dioxide pulse progresses through the bed, most of the residual ethylene in the bed is continually desorbed in favor of the more strongly held carbon dioxide. The result is that contact of the hot purge gas with the ethylene is minimized since the carbon dioxide acts as a buffer and coking is substantially reduced.

The above described process is especially useful for separating carbon dioxide from ethylene when the demethanizer does not contain such impurities as $CO_2$ and $C_2H_2$ which must be removed with a guard bed since their presence in the $C_2H_4$ product is not desirable.

At the start of regeneration, the gas leaving the molecular sieve bed will be rich in $C_2H_4$. It may be possible to recycle this gas to some point in the ethylene plant to use this ethylene. The ethylene content of the effluent gas at the early stage of regeneration will be very high (e.g., 10% of a blowdown is used, 30 lb. percent if no blowdown is used).

The following is an example of the embodiment of the invention shown in FIG. 2. Under the conditions in the example below a net increase in the ethylene yield of about 2.0% over the method omitting the use of demethanizer overhead.

In this example the feed gas stream contained about 0.7 mol percent of carbon dioxide. The temperature may be from 40° to 150° F. In this case the feed was at about 75° F. The feed stream was at a pressure of 510 p.s.i.g. and was fed at the rate of 22,000 lb./hr. to adsorber A as the adsorption step. The adsorption step is terminated in bed A when the content of carbon dioxide in the product stream is about 5 parts per million. While bed A is an adsorption, beds B and C are being regenerated and cooled and preloaded respectively. Demethanizer off-gas containing about 2% ethylene at a temperature of about 50° F. and a pressure of about 140 p.s.i.g. is fed to bed C which has previously completed the regeneration step and is at about 500° F. Bed C is cooled and the demethanizer off-gas is heated while ethylene is removed from such gas by adsorption step. The ethylene depleted off-gas is further heated in a heating means to a temperature of about 500° F. and then passed in a cocurrent direction down through bed B which has previously completed an adsorption step and is at a temperature of about 75° F. The bed temperature is raised to about 500° F. at which point desorption is sufficiently complete to achieve satisfactory operation on return to adsorption; however if in the timing of the overall process cycle there remains time, additional purging may be done to further reduce the residual carbon dioxide in the bed.

In a cyclic manner each of the beds alternate consecutively on adsorption, regeneration, and cooling and preloading.

Referring more specifically to a FIG. 2 carbon dioxide impurity containing ethylene stream is introduced through conduit 60, valve 61 and branch conduit 62 to zeolitic molecular sieve bed A. A carbon dioxide depleted ethylene gas stream is discharged from bed A through branch conduit 63, valve 64 and conduit 65. At the end of the adsorption stroke valve 61 is closed and previously closed valve 65 is opened permitting feed to be introduced through conduits 66 and 67 to bed C which was previously cooled and pre-loaded. While bed A is on adsorption, beds B and C are on regeneration and cooling and preloading respectively. This is accomplished by providing demethanizer overhead gas at about 50° F. and 140 p.s.i.g. through conduit 68, valve 69 and conduit 67 to bed C which has previously completed a regeneration step and is at about 500° F. As the cooling demethanizer overhead gas containing up to ~2% ethylene passes through bed C the ethylene is adsorbed in the cool portion of the bed. The ethylene depleted cooling gas is discharged from bed C through conduit 70 and valve 71 and passes through conduit 72 to heater H where the cooling gas is heated to about 550° F. and is ready for use as a hot purge gas to regenerate bed B. The hot purge gas leaves the heater H through conduit 73 and enters the bed B through valve 74 and conduit 75 to commence the regeneration of said bed which has previously completed adsorption. Bed B which is at a temperature of about 75° F. is depressurized and raised to a temperature of about 500° F. The purge gas leaves bed B through branch conduit 76, valve 77 and conduit 78.

While bed A is adsorbing and beds B and C are being regenerated and cooled and pre-loaded valves 79, 80, 81 and 82 associated with bed A; valves 83, 84, 85 and 86 associated with bed B and valves 65, 87, 88 and 89 associated with bed C are all closed. It is to be understood that the appropriate valves will be opened to each bed for the corresponding step in the cycle.

Although the inventive concept has been described in detail referring to a carbon dioxide from ethylene separation and referring to the preferred embodiments shown in the drawings it is contemplated that modification of the method may be made and that some features may be employed without others all within the spirit and scope of the invention.

What is claimed is:

1. A process for purifying an ethylene gas stream which comprises providing a fixed bed of crystalline zeolitic molecular sieve material having pore sizes of at least 4 angstrom units; providing an ethylene feed gas stream containing an admixture of carbon dioxide impurity in ethylene gas product; contacting such stream with said bed as an adsorption step by introducing said feed gas stream at the inlet end thereof to adsorb at least part of said carbon dioxide impurities and part of said ethylene product gas in said bed of crystalline zeolitic molecular sieve material, discharging a carbon dioxide impurity depleted ethylene product gas stream from the opposite end of said bed; establishing a carbon dioxide impurity adsorption front at said inlet end; progressively moving such front longitudinally through said fixed bed toward the opposite end thereof thereby displacing said ethylene product gas with carbon dioxide impurity in said crystalline zeolitic molecular sieve material as the result of the movement of said carbon dioxide impurity adsorption front; terminating the introduction of said feed gas stream to said bed to complete the adsorption step; as a regeneration step introducing a hot purge gas having a temperature substantially higher than the temperature at which the adsorption step takes place to the inlet end of said bed and flowing said purge gas in the same direction as said feed gas to regenerate such bed; as a cooling step providing a cooling gas at the inlet end of said bed at a temperature less than that at which regeneration takes place and flowing said cooling gas in the same direction as said feed and purge gases; and as preloading step providing at the inlet end of said bed a gas containing at least part of said ethylene product gas and flowing such gas in the same direction as said feed, purge and cooling gases to adsorb said product gas in such zone thereby partially preloading said bed with a product gas prior to the beginning of the adsorption step whereby a net increase in the yield of ethylene product gas is realized.

2. A process for continuously purifying a gas stream which comprises providing a feed gas stream containing an admixture of impurity in gas product; providing at least four adsorption zones, each having an inlet end and a discharge end and containing therein a bed of crystalline zeolitic molecular sieve material having pore sizes of at least 4 angstrom units, said bed having voids between said zeolitic molecular sieve material; introducing said feed gas stream to a first adsorption zone inlet end and contacting such stream with the first adsorption zone bed at a first pressure as an adsorption step to adsorb at least part of said impurity and part of said gas product in said zeolitic molecular sieve material and trapping part of said gas product in said voids; discharging an impurity depleted product gas stream from the first adsorption zone discharge end; establishing an impurity adsorption front at said first adsorption zone inlet end; progressively moving such front longitudinally through said first adsorption zone toward said first adsorption zone discharge end to a predetermined point within said first adsorption zone thereby displacing most of said adsorbed product gas with impurity in said zeolitic molecular sieve material as the result of the movement of said impurity adsorption front; terminating the introduction of said feed gas stream to said adsorption zone inlet end to complete the adsorption step in said first adsorption zone; as a cocurrent depressurization step controllably reducing said first pressure in said first adsorption zone to a second lower pressure through said first adsorption zone discharge end thereby further moving said impurity adsorption front toward the discharge end of said first adsorption zone so as to remove the trapped product gas from the voids of said first adsorption zone; as a regeneration step desorbing a second adsorption zone having previously completed the cocurrent depressurization step; said regeneration step being accomplished by introducing a hot purge gas to the inlet end of said second adsorption zone for flow in the same direction as said feed gas to regenerate said zone; as a cooling step providing a cooling gas stream at the inlet end of a third adsorption zone having previously completed a regeneration step and flowing said cooling gas through the third zone in the same direction as the feed and purge gases; and as a preloading step providing at the inlet end of a fourth adsorption zone a gas stream containing a product gas fraction and flowing the preloading gas in the same direction as the feed, purge and cooling gases to adsorb in such fourth zone at least part of said product gas fraction thereby partially preloading said fourth zone with product gas prior to said adsorption step in said fourth zone; discharging a product depleted gas stream from said fourth adsorption zone discharge end and introducing such gas stream to said third adsorption zone inlet end as the cooling gas stream to cool such third zone; periodically switching the flow between said adsorption zones so that the adsorption step takes place in the zone that has previously completed the preloading step; the cocurrent depressurization step takes place in the zone that has previously completed the adsorption step; the cooling step takes place in the zone that has previously completed a regeneration step, the regeneration step takes place in the zone that has previously completed the cocurrent depressurization step; and the preloading step takes place in the zone that has previously completed the cooling step.

3. The process according to claim 2 in which the impurity is carbon dioxide and the product gas is ethylene.

4. A process according to claim 2 wherein the crystalline zeolitic molecular sieve material has a pore size of at least about 4.6 angstrom units.

5. A process according to claim 4, wherein the hot purge gas introduced to said second adsorption zone inlet end establishes an impurity pulse consisting of an impurity desorption front and an impurity adsorption front in the inlet end of said second adsorption zone, progressively moving such pulse longitudinally through such second zone from the inlet end to the discharge end thereof, thereby displacing the residual of said adsorbed product gas from the zone of the progressing impurity adsorption front of said impurity pulse.

6. A process for continuously purifying an ethylene gas stream which comprises providing a feed gas stream containing an admixture of carbon dioxide impurity in ethylene gas product; providing at least three adsorption zones, each having an inlet end and a discharge end and containing therein a fixed bed of crystalline zeolitic molecular sieve material having pore sizes of at least 4 angstrom units, introducing said feed gas stream to a first adsorption zone inlet end and contacting such stream with the first adsorption zone bed as an adsorption step to adsorb at least part of said carbon dioxide impurities and part of said ethylene product gas in said zeolitic molecular sieve material; discharging a carbon dioxide impurity depleted ethylene product gas stream from the first adsorption zone discharge end; establishing a carbon dioxide impurity adsorption front at said first adsorption zone inlet end; progressively moving such front longitudinally through sad first adsorption zone toward said first adsorption zone discharge end thereby displacing said ethylene product with carbon dioxide impurity in said zeolitic molecular sieve material as the result of the movement of said impurity adsorption front; terminating the introduction of said feed gas stream to said first adsorption zone; as a regeneration step desorbing a second adsorption zone having previously completed an adsorption step; and as a cooling and preloading step providing a cooling gas containing at least port of said ethylene product gas in a third adsorption zone having previously completed a regeneration step, said regeneration step and said cooling and preloading step being accomplished substantially simultaneously by passing said cooling gas through said third adsorption zone from the inlet end to the discharge end thereof and in the same direction as said feed gas to cool said third adsorption zone and simultaneously adsorb said product gas thereby partially preloading said third zone with said product gas prior to said adsorption step in said third zone; then discharging the product-depleted cooling gas from said third adsorption zone and heating such gas to a temperature substantially higher than that of the adsorption step thereby forming a purge gas; introducing the purge gas to the inlet end of said second adsorption zone as said regeneration step and flowing said purge gas to the discharge end in the same direction as the feed and cooling gases; periodically switching the flows between said adsorption zones so that the adsorption step takes place in the zone that has previously completed a cooling and preloading step, the regeneration step takes place in the zone that has previously completed the adsorption step, and the cooling and preloading step takes place in the zone that has previously completed the regeneration step.

7. A process according to claim 6 wherein the zeolitic molecular sieve material is selected from the class consisting of the naturally occurring crystalline molecular sieve eronite, calcium-rich chabazite, faujasite, the synthetic zeolites X, Y, L, T and the divalent cation exchanged zeolites A, D and R.

8. A process according to claim 6 wherein the feed gas stream is introduced to said first adsorption zone at from about 40° to 250° F. and from about atmosphere to 1500 p.s.i.g.

9. A process for continuously purifying a gas stream which comprises providing a feed gas stream containing an admixture of greater than 0.2 percent by volume of carbon dioxide in ethylene; providing at least three adsorption zones, each having an inlet and a discharge end and containing therein a bed of crystalline zeolitic molecular sieve material having pore sizes of at least 4 angstrom units, said bed having voids between said zeolitic molecular sieve material; introducing said feed gas stream to a first adsorption zone inlet end and contacting such stream with the first adsorption zone bed at a first pressure as an adsorption step to adsorb at least part of said carbon dioxide and part of said ethylene in said zeolitic molecular sieve material and trapping part of said ethylene in said voids; discharging a carbon dioxide depleted ethylene gas stream from the first adsorption zone discharge end; establishing a carbon dioxide adsorption front at said first adsorption zone inlet end; progressively moving such front longitudinally through said first adsorption zone toward said first adsorption zone discharge end to a predetermined point within said first adsorption zone thereby displacing most of said adsorbed ethylene gas with carbon dioxide in said zeolitic molecular sieve material as the result of the movement of said carbon dioxide adsorption front; terminating the introduction of said feed gas stream to said first adsorption zone inlet end to complete the adsorption step in said first adsorption zone; as a cocurrent depressurization step controllably reducing said first pressure in said first adsorption zone to a second lower pressure through said first adsorption zone discharge end thereby further moving said carbon dioxide adsorption front toward the discharge end of said first adsorption zone thereby removing the trapped ethylene gas from the voids of said first adsorption zone; as a regeneration step desorbing a second adsorption zone having previously completed a cocurrent depressurization step; and as a cooling and preloading step providing a gas stream containing an ethylene fraction in a third adsorption zone having previously completed a regeneration step; said regeneration step and said cooling and preloading step being accomplished substantially simultaneously by passing a cooling gas stream containing an ethylene gas fraction through said third adsorption zone from the inlet end to the discharge end thereof and in the same direction as said feed gas to cool said third adsorption zone and simultaneously adsorb in such zone at least part of said ethylene gas fraction thereby partially preloading said third zone with ethylene gas prior to said adsorption step in said third adsorption zone and passing such gas through a heating means to raise the temperature of said gas from about 75° F. to 500°–550° F.; introducing the resulting hot purge gas to the inlet end of said second adsorption zone and flowing said purge gas to the discharge end in the same direction as the feed and cooling gases to regenerate said zone; periodically switching the flows between said adsorption zones so that the adsorption step takes place in the zone that has previously completed a cooling and preloading step, the cocurrent depressurization step takes place in the zone that has previously completed an adsorption step, the desorption step takes place in the zone that has previously completed the cocurrent depressurization step, and the cooling and preloading step takes place in the zone that has previously completed the desorption step.

10. A process according to claim 9 wherein the hot purge gas introduced to said second adsorption zone inlet end establishes a carbon dioxide impurity pulse consisting of a carbon dioxide impurity desorption front and a carbon dioxide impurity adsorption front in the inlet end of said second adsorption zone, progressively moving such pulse longitudinally through such second zone from the inlet end to the discharge end thereof, thereby displacing the residual of said adsorbed ethylene product gas from the zone of the progressing carbon dioxide impurity adsorption front of said carbon dioxide impurity pulse.

11. A method for separating carbon dioxide impurity from ethylene product gas in an ethylene formation process wherein a demethanizer off-gas is readily available from other steps in the ethylene formation process, which comprises providing a feed gas stream containing an admixture of carbon dioxide in ethylene; providing at least four adsorption zones, each having an inlet end and a discharge end and containing therein a bed of crystalline zeolitic molecular sieve material having pore sizes of at least four angstrom units, said bed having voids between said zeolitic molecular sieve material; introducing said feed gas stream to a first adsorption zone inlet end and contacting such stream with the first adsorption zone bed at a first pressure as an adsorption step to adsorb at least part of said carbon dioxide and part of said ethylene gas product in said zeolitic molecular sieve material and trapping part of said ethylene gas product in said voids; discharging a carbon dioxide depleted product gas stream from the first adsorption zone discharge end; establishing a carbon dioxide adsorption front at said first adsorption zone inlet end; progressively moving such front longitudinally through said first adsorption zone toward the discharge end to a predetermined point within said first adsorption zone thereby displacing most of said adsorbed ethylene product gas with carbon dioxide impurity in said zeolitic molecular sieve material as the result of the movement of said carbon dioxide adsorption front; terminating the introduction of said feed gas stream to said adsorption zone inlet end to complete the adsorption step in said first adsorption zone; as a cocurrent depressurization step controllably reducing said first pressure in said first adsorption zone to a lower pressure through said first adsorption zone discharge end thereby further moving said carbon dioxide adsorption front toward the discharge end of said first adsorption zone so as to remove the trapped ethylene product gas from the voids of said first adsorption zone; collecting at least part of the ethylene product gas effluent from the first adsorption zone discharge end in a tank during such cocurrent depressurization step; as a regeneration step desorbing a second adsorption zone having previously completed the cocurrent depressurization step by introducing a hot purge gas containing at least some of said demethanizer off-gas to the inlet end of a second adsorption zone and flowing said purge gas to the discharge end in the same direction as said feed gas to regenerate said zone; as a cooling step providing as a cooling gas stream the demethanizer off-gas to the inlet end of the third adsorption zone having previously completed a regeneration step and flowing such gas to the discharge end in the same direction as said feed and purge gases; and as a preloading step providing to the inlet end of a fourth adsorption zone said demethanizer off-gas together with ethylene product gas supplied from said tank and flowing said gas to the discharge end in the same direction as said feed, purge and cooling gases to adsorb in such fourth zone at least part of said ethylene gas fraction thereby partially preloading said fourth zone with ethylene product gas prior to said adsorption step in said fourth zone; passing said demethanizer off-gas through a guard bed to remove acetylene and carbon dioxide therefrom prior to introducing said demethanizer off-gas to said fourth adsorption zone; discharging an ethylene depleted demethanizer gas stream from said fourth adsorption zone and introducing such ethylene depleted demethanizer off-gas stream to said third adsorption zone as the cooling gas stream to cool such third zone; discharging said demethanizer off-gas cooling stream from said adsorption zone and combining such stream with an inert gas, passing such combined inert gas and demethanizer off-gas stream through a heating means to raise the temperature of such gas and then providing such hot combined gas stream to said second adsorption zone to perform the regeneration step therein.

12. A process according to claim 11 wherein the feed gas stream is introduced to said first adsorption zone at from about 50° to 100° F. and from about 50 to 600 p.s.i.a.

13. A process according to claim 11 wherein the feed gas stream is supplied to the first adsorption zone inlet end at the rate of 22,000 lbs./hr.; at a first pressure of about 510 p.s.i.g.; and at a temperature of about 75° F.

14. A process according to claim 13 wherein the hot purge gas introduced to said second adsorption zone inlet end establishes a carbon dioxide impurity pulse consisting of a carbon dioxide impurity desorption front and a carbon dioxide impurity adsorption front in the inlet end of said second adsorption zone, progressively moving such pulse longitudinally through such second zone from the inlet end to the discharge end thereof, thereby displacing the residual of said adsorbed ethylene product gas from the zone of the progressing carbon dioxide impurity adsorption front of said carbon dioxide impurity pulse.

References Cited by the Examiner

UNITED STATES PATENTS

| 2,519,874 | 8/50 | Berg | 55—61 |
| 2,799,362 | 7/57 | Miller | 183—114.2 |
| 2,901,519 | 8/59 | Patterson | 183—114.2 |
| 2,944,627 | 7/60 | Skarstrom | 183—114.2 |
| 2,995,208 | 8/61 | Hachmuth et al. | 55—180 X |
| 3,085,379 | 4/63 | Kiyonaga et al. | 55—62 |
| 3,130,021 | 4/64 | Milton | 55—33 |

FOREIGN PATENTS 555,482   4/58   Canada.

HARRY B. THORNTON, *Primary Examiner.*

EUGENE S. BLANCHARD, REUBEN FRIEDMAN, WALTER BERLOWITZ, *Examiners.*